United States Patent
Birchfield et al.

(10) Patent No.: US 6,781,507 B1
(45) Date of Patent: Aug. 24, 2004

(54) REMOTE START, PASSIVE ANTI THEFT SECURITY SYSTEM

(75) Inventors: Jerry W. Birchfield, Vista, CA (US); Bounthavy K. Manivone, Vista, CA (US)

(73) Assignee: Directed Electronics, Inc., Vista, CA (US)

( * ) Notice: Subject to any disclaimer, the term of this patent is extended or adjusted under 35 U.S.C. 154(b) by 1164 days.

(21) Appl. No.: 08/857,711

(22) Filed: May 16, 1997

(51) Int. Cl.[7] .............................. G06F 7/04; H04Q 7/00
(52) U.S. Cl. ................ 340/5.61; 340/10.1; 340/825.69
(58) Field of Search ....................... 340/825.31, 825.54, 340/825.69, 825.72, 426, 572.1, 10.1, 5.31, 5.61, 5.72, 5.64; 307/10.5, 10.3; 341/176; 342/41, 44, 51; 123/179.2; 180/287

(56) References Cited

U.S. PATENT DOCUMENTS

| | | | |
|---|---|---|---|
| 4,471,343 A | * 9/1984 | Lemelson | 307/10.5 |
| 4,737,789 A | * 4/1988 | Nysen | 342/51 |
| 4,847,614 A | * 7/1989 | Keller | 340/825.56 |
| 4,980,680 A | * 12/1990 | Knoll et al. | 340/825.31 |
| 5,184,584 A | * 2/1993 | Cantrell | 123/179.2 |
| 5,561,430 A | 10/1996 | Knebelkamp | |
| 5,612,578 A | * 3/1997 | Drew | 307/10.5 |
| 5,635,900 A | 6/1997 | Hasegawa et al. | |
| 5,648,764 A | * 7/1997 | Nose | 340/825.32 |
| 5,659,291 A | 8/1997 | Kennedy et al. | |
| 5,679,984 A | 10/1997 | Talbot et al. | |
| 5,684,339 A | 11/1997 | Treharne | |

* cited by examiner

Primary Examiner—Edwin C. Holloway, III
(74) Attorney, Agent, or Firm—KC Bean, Esq.; Anatoly S. Weiser, Esq.

(57) ABSTRACT

A remote starting system operable with a passive anti theft security system. The passive anti theft security system includes a first coil connected to a passive anti theft controller, which is used for transmitting a first signal to a first transponder. The first transponder has a third coil and a first code. The first transponder is responsive to the first signal and transmits the first code to the first coil. The remote starting system comprises a second transponder, which has a second code and a fourth coil. The fourth coil has two terminal ends wound about the second transponder. The system further comprises a relay that selectively shorts or opens the terminal ends of the fourth coil so as to selectively enable and disable the second transponder.

23 Claims, 2 Drawing Sheets

REMOTE START, PASSIVE ANTI THEFT SECURITY SYSTEM

BACKGROUND OF THE INVENTION

1. Field of the Invention

This invention relates to systems having the capability of remotely operating a vehicle. These systems employ wireless transmitters for its operation and control. More importantly, this invention discloses a novel way by which one can remotely operate a vehicle without compromising the vehicle's passive anti theft security system.

2. Description of Prior Art

One of the features of the automotive security and convenience systems is the ability to remotely start or operate certain functions of a vehicle. This feature has been found to be highly desirable. However, as explained in further detail below, with the recent implementation of passive anti theft security systems the remotely operable features such as remote start and keyless entry may be rendered inoperable because the passive anti theft security system expects a transducer in its vicinity to operate nominally.

A passive anti theft security system includes a miniature transponder embedded or attached to a key of the vehicle. This system further includes a controller mounted in the vehicle. This controller employs at least one and sometimes two coils. Currently, the first and second coils are placed about the ignition switch of the vehicle. In systems employing two coils, the second coil is commonly placed adjacent to the first coil. Some passive anti theft security systems employ a single coil serving a dual role as described in detail below. Other passive anti theft security systems employ two coils, one performing the radiating function of a transmitter and the other one performing the receiving function of a receiver. A passive anti theft security system additionally comprises a transponder which employs a third coil. This third coil is often wound about the internal circuitry of the transponder. The internal circuitry stores energy and/or signal(s) and generates and sends signal(s) to the passive anti theft security system controller via the first and/or second coil.

The operation of the passive anti theft security system can be described as follows. The authorized user of the vehicle places the physical key and the embedded passive anti theft security system transponder therein into the ignition switch of the vehicle and turns the key to the start position. The passive anti theft security system controller energizes the first coil for a period of time and induces a voltage from the first coil to the third coil embedded in the transponder. The third coil stores the energy it receives in a storage device within the transponder, such as a battery or a capacitor. When the first coil stops transmitting the signal, the transponder uses the stored energy to transmit a signal via the third coil to the first and/or second coils. Embedded in the signal is a code, such as a digital word, which is decoded by the passive anti theft security system controller. The passive anti theft security system controller compares the received code with table of authorized codes stored or generated therein. If the code is not received and/or not confirmed as an authorized code, the passive anti theft security system controller shuts down the vehicle and/or effects its normal operation.

As evident from the above, security and/or convenience systems having remote start capability are inhibited from operating as intended unless they supply the passive anti theft security system controller the proper authorized code it expects.

To overcome this problem, many after-market installations bypass the passive anti theft security system by disconnecting it or by attaching and/or anchoring an authorized transponder in or about the ignition switch. This deletes and/or compromises the benefits of the security provided by the passive anti theft security system. Additionally, this diminishes the value of the vehicle. Others avoid installing remotely operable systems in vehicles equipped with a passive anti theft security system.

Therefore, there remains a need for a remotely controllable system capable of remotely operating and/or starting vehicles equipped with a passive anti theft security system without compromising its security, functionality and integrity.

SUMMARY OF THE INVENTION

It is the object of the present invention to provide remote operation and/or remote start capability to vehicles equipped with passive anti theft security systems, without compromising its integrity, functionality, security, value and/or effect. It is a further object of the present invention to provide a second authorized transponder, having a fourth coil, programmed into the passive anti theft security system and to place the same in the vicinity of the ignition switch or the area protected by the passive anti theft security system of the vehicle. It is the object of this invention to provide a fourth coil, having two terminal ends, wrapped about the second authorized transponder. It is a further object of this invention to connect these terminal ends to a normally closed relay, which is operable by a signal controlled by a system having the capability of remotely operating and/or starting a vehicle. It is a further object of this invention to employ this fourth coil as a shield to the second transponder when its terminal ends are shorted and to prevent the third coil of the second transponder from receiving the signal from the first coil generated by the passive anti theft security system, when the terminal ends of the fourth coil are in a closed circuit position. Conversely, when the terminal ends of the fourth coil are in an open circuit position, the first coil is able to transmit to the third coil of the second transponder. It is a further object of this invention to provide a fault state of the remote start system that allows normal operation of the passive anti theft security system. It is a further object of this invention not to provide a thief with an operable transponder capable of overcoming the security, functionality and integrity of the passive anti theft security system.

In sum, it is the object of this invention to employ a second, normally dormant transponder, capable of function when the system having the capability of remotely starting or operating a vehicle sends the proper control signal to open the terminal ends of the fourth coil allowing it to function as an authorized transponder. It is the object of this invention to provide remote control and/or starting capability for a vehicle without compromising the functionality and integrity of the passive anti theft security system. It is also the object of this invention to maintain the integrity and the requirement of having a transponder within the key needed to turn the ignition switch of a vehicle to the run or start position and operate the vehicle. It is an object of this invention to require full functionality of the passive anti theft security system including its transponder, the first and/or second coils, ignition key and a second transponder, in a vehicle equipped with a passive anti theft security system and a system having the capability of remotely starting a vehicle. It is an object of this invention to provide an economical and effective security and/or convenience system for use with vehicles. It is an object of this invention to provide the above-recited objects and functions in a readily manufacturable, economical and practical way.

These and other objects of the invention may be found from a fair reading of the description of the preferred embodiment taken along with the drawings appended hereto. The scope of protection sought by the inventors may be gleaned from a fair reading of the claims that conclude this specification.

DESCRIPTION OF THE PREFERRED EMBODIMENT

The term "passive anti theft security system", adopted in this description, is used by Ford Motor Company. General Motors Corporation refers to it as "PASS KEY THREE". However, these systems share the same general theory of operation and function similarly.

Figure 2:
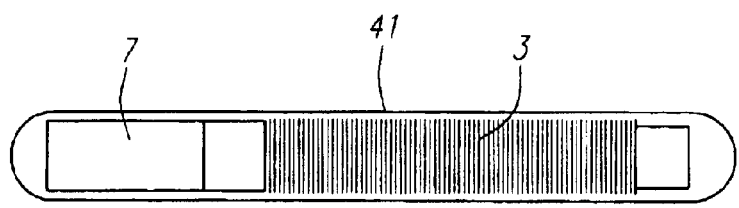
FIG. 2 is a side view of a passive anti theft security system transponder.
Figure 3A:
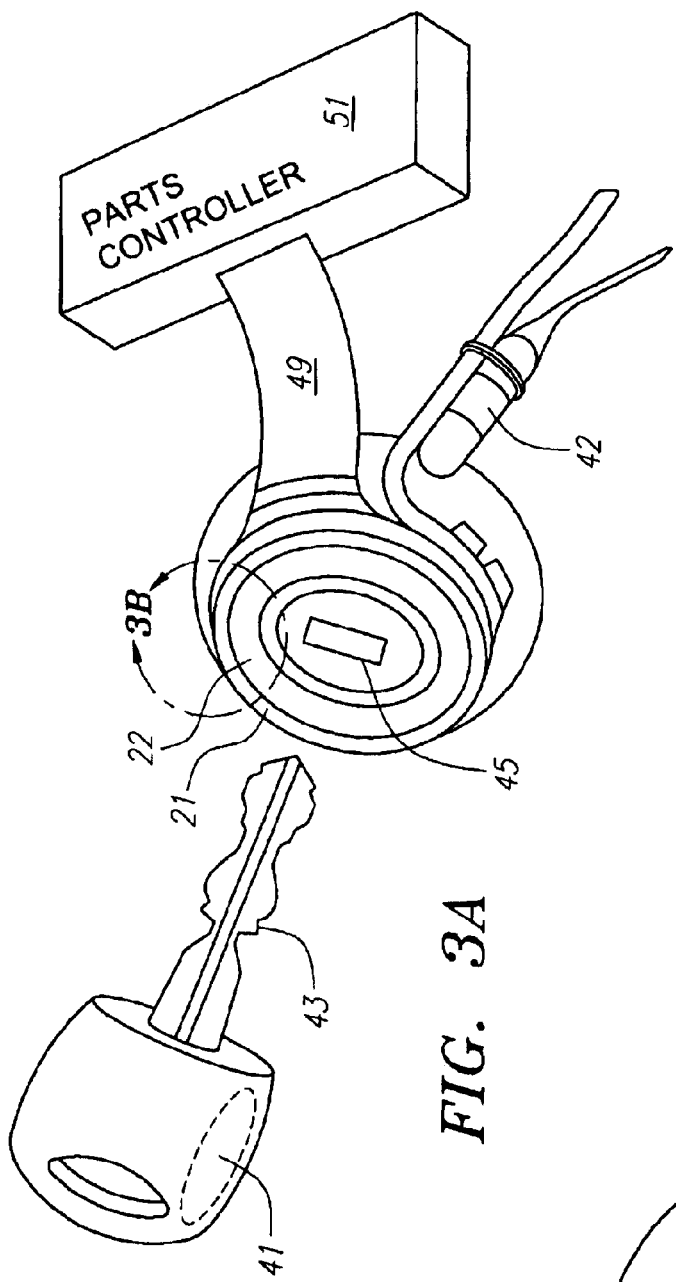
FIGS. 3A and 3B show a key having an embedded transponder therein in alignment with the ignition switch and the second transponder affixed thereto.
Figure 3B:
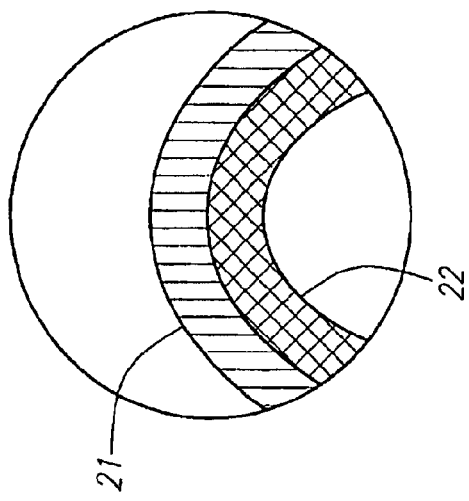

As illustrated in FIGS. 3A and 3B, vehicles employing passive anti theft security systems generally operate as follows. Passive anti theft security system comprises, in addition to a controller 51 and a transponder 41 mounted about the key 43, a first, second and third coils 21, 22 and 3, respectively. The first and second coils are connected to controller 51 via a bus 49. Controller 51, in a form of a single or multiple modules, also performs the functions of a transmitter, receiver, decoder, encoder and has memory. Controller 51 through bus 49 and first coil 21, when the ignition switch 45 is turned to the start position, drives coil 21 at a low kilohertz frequency. One such frequency is 134.2 kHz. This signal may or may not be encoded with a message or a coded word. Key 43 which is about or inside the ignition switch 45, at the time it turns switch 45 to its start position, is also inside or about the first coil 21. Transponder 41, is shown in more detail in FIG. 2 less coil 4. Transponder 41, via its third coil 3, receives and stores energy and/or information radiated from first coil 21, while first coil 21 is energized. Transponder 41 stores this energy and/or receives the message radiated from the first coil 21. The energy is stored in a storage device such as a capacitor or battery (not shown).

After a predetermined period of time, controller 51 terminates its transmission via first coil 21. Thereafter, the energy stored in the storage device of transponder 41 is used to power the circuit and/or logic in the circuit board 7 of transponder 41 to send a coded transmission word back to controller 51. This coded word is generated by circuitry contained on board 7. This word may be generated using any convention, including, but not limited to static, dynamic, analog, binary, trinary or any combination thereof, depending on the circuit and logic in board 7. This coded and/or encrypted word is transmitted to second coil 22 via third coil 3. To accomplish this, the circuitry of transponder 41, using the energy stored in the storage device and coded word generated by the circuitry on board 7, transmits the coded word via third coil 3, second coil 22 and bus 49 to controller 51 where it is decoded. If controller 51, after decoding the received transmission, determines that the transmission came from an authorized transponder 41, it provides the necessary signals to continue the operation of the vehicle and/or withholds interrupt signal(s) which would terminate normal operation of the vehicle or its power plant. If controller 51 does not recognize transponder 41 as an authorized transponder, it does not provide the necessary signals to continue the operation of the vehicle and/or it issues interrupt signal(s), which terminate normal operation of the vehicle or its power plant.

Although vehicle manufacturers do not use identical passive anti theft security systems, they are similar. Currently Ford Motor Company uses a passive anti theft security system with two coils about the ignition switch. Its controller pulses the signal to the first coil for a predetermined period of time and expects a return, authorized signal back from a transponder via its second coil. General Motors Corporation uses a single coil about the ignition switch. The passive anti theft security system controller and the transponder are continuously operable. General Motors' signal is a continuous signal of about 134 kHz. Its passive anti theft security system controller continuously sources energy to its transponder and continuously receives its code. Although these systems are different, the device of the present invention equally solves the stated objects of the invention without regard to the type of passive anti theft security system employed. For simplicity, this description of the preferred embodiment describes the operation of the present invention as installed in a Ford Motor Company's passive anti theft security system.

In sum, passive anti theft security system is effective and it provides value and security protection to the vehicle. It is important to maintain its integrity and functionality in combination with additional security and/or convenience systems having remote start and/or operation capability.

Figure 1:
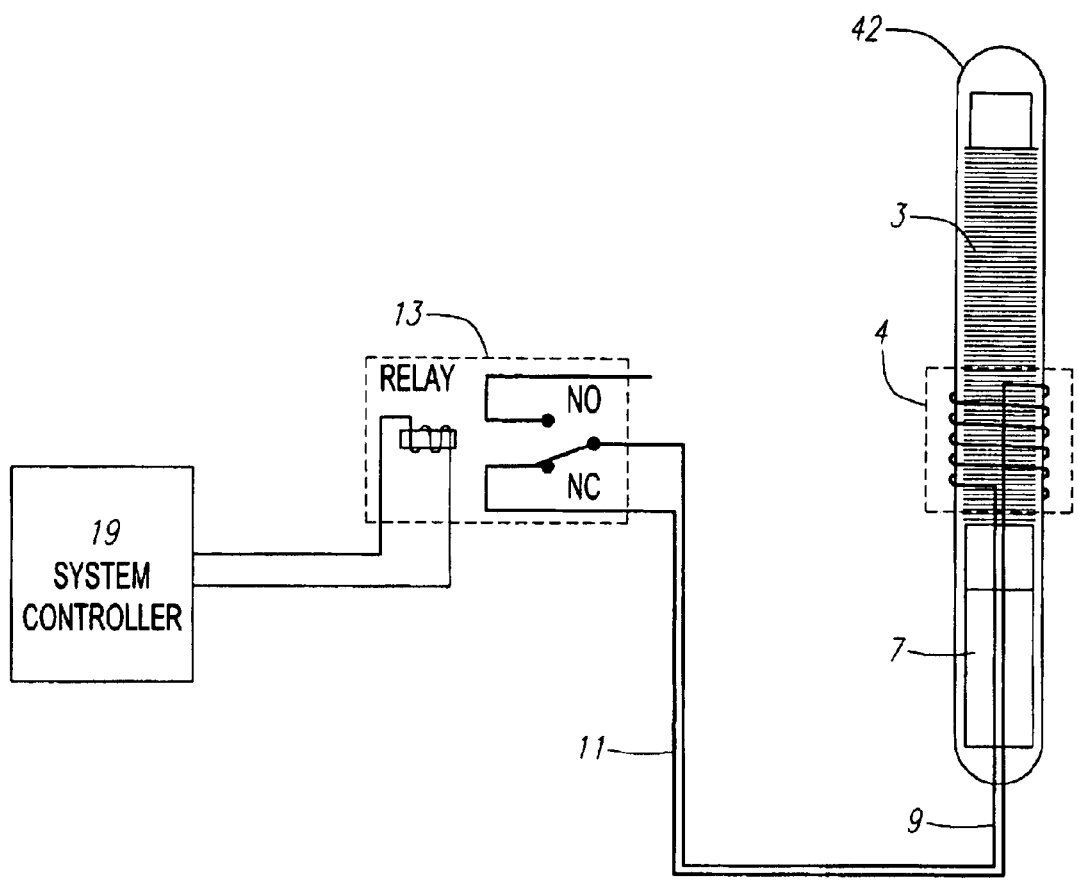
FIG. 1 is a schematic representation of the second transponder, having the fourth coil thereon, connected to a normally closed relay controlled by remote control security/convenience system.

As described above, the passive anti theft security system renders the remote start or operation functions inoperable. The remote start feature of a security and/or convenience system transmits a control signal from its remote, wireless transmitter to a controller 19, shown in FIG. 1, which has the capability of remotely operating and/or starting a vehicle. In one instance, controller 19 issues the necessary signals to the vehicle allowing it to start the car by operating the ignition and the starter motor. It also issues the necessary signals to disengage the operation of the starter motor when the engine starts. However, in a vehicle equipped with a passive anti theft security system, the vehicle will not start, or it will start and then shut down.

The reason the vehicle will not start is as follows. First coil 21 transmits a signal and stops. Thereafter passive anti theft security system controller 51 expects to receive a transmission from an authorized transponder 41. If the vehicle is being remotely started, there is no key 43 and no associated transponder 41 about the ignition switch 45 to send the required signal to coil 22 and passive anti theft security system controller 51. Because controller 51 does not receive the required signal, it causes the engine not to start or operate properly.

To overcome this, the industry has employed two undesirable solutions. First, installers have been disengaging the passive anti theft security system. In the alternative, they removed transponder 41 from key 43 and permanently placed it inside or nearby first and second coils 21 and 22. These solutions equally disabled the passive anti theft security system and allowed an unauthorized user or thief to operate the vehicle because in both scenarios there is no protection by passive anti theft security system as it is either disconnected or the transponder 41, is rendered always operable.

The present invention overcomes the shortcomings of the present solutions, while maintaining the functionality and the integrity of the passive anti theft security system. It employs a second transponder 42 and a fourth coil 4, shown in FIG. 1. Second transponder 42 is positioned about the ignition switch 45 to receive the signal transmitted by first coil 21. Fourth coil 4 is wound around the capsule shell of second transponder 42. Coil 4 comprises at least one, but preferably two or more loops of wire. It is positioned in the vicinity of the third coil 3 of second transponder 42. Further, fourth coil 4 has two terminal ends 9. They are respectively connected to two wire leads 11, which electrically couple/connect fourth coil 4 to a normally closed relay 13.

The effect of having the fourth coil 4, which is normally shorted/closed via relay 13, is to block or partially shield the transmitted energy and/or signal from first coil 21. This is necessary because second transponder 42 is placed about the ignition switch 45 and is always in position to receive the signal from first coil 21 and to transmit its authorized code to controller 51 via second coil 22. If it is always operable, it will always receive the signal and/or energy from controller 51, and it will always transmit at the same time as the first transponder 41 transmits, when key 43 engages switch 45 to its start position. Controller 51 will not recognize two authorized codes transmitted by two authorized transponders at or about the same time. This renders the vehicle inoperable by the passive anti theft security system. Therefore, for normal operation only one of transponders 41 or 42 should communicate with controller 51.

The device of the present invention provides a second, stationary, authorized transponder 42, selectively capable of receiving the transmission from controller 51 via first coil 21, and transmitting to controller 51 an authorized code via its third coil 3 and second coil 22, when system 19 remotely starts or operates the vehicle and key 43, together with its associated transponder 41, are not about the ignition switch 45. More particularly, second transponder 42 is selectively disabled by fourth coil 4, normally closed contacts of relay 13 and system 19 so that key 43 and its associated transponder 41 nominally start and operate the vehicle. Second transponder 42 is rendered normally inoperable by shorting fourth coil 4 via normally closed relay 13. Under these conditions, the vehicle's passive anti theft security system continues to operate nominally.

However, when key 43 and its associated transponder 41 are not about the ignition switch 45 and the vehicle is being remotely started and/or operated by system 19, system 19 enables the operation of second transponder 42 by opening the normally closed relay 13 and fourth coil 4. This allows the transmission signal from controller 51, via first coil 21, to be transmitted to second transponder 42 in a normal mode of operation described above. The transponder 42 receives the signal from coil 21 and responds by sending its signal and authorized code to controller 51 via its third coil 3. Controller 51 via the second coil 22 receives this signal and code and the vehicle is therefore allowed to operate and/or start.

The device of the present invention, therefore, maintains and preserves the functionality and integrity provided by the passive anti theft security system while allowing system 19 to remotely operate and/or start the vehicle. Additionally, in the preferred embodiment, if system 19 and/or its associated components fail, it designed to fail leaving relay 13 in its normally closed position. This has the effect of rendering second transponder 42 inoperable and transparent to the passive anti theft security system. It also leaves the vehicle in the state absent the additional features of system 19, transparently free of any defect and operable with key 43. Further, the device of the present invention does not provide a thief with an operable "embedded key" (authorized transponder) about coils 21 and 22 to overcome the passive anti theft security system functions. If a thief disconnects system 19 to overcome the alarm or other security features of system 19, second transponder 42 maintains its inactive state and does not aid the thief because its terminal ends 9 are shorted via normally closed relay 13, thus shorting fourth coil 4.

Although heretofore the preferred embodiment has been described in the context of operation of the passive anti theft security system in an ignition circuit and in the context of making a remote start system operable with the passive anti theft security system, other embodiments are also covered by this invention. The principles heretofore described are equally applicable to the operation of any area or function where a passive anti theft security system is employed. One such application (not shown in a drawing) may be in a door of the vehicle where transponder 41 is required to open the door. In this embodiment the same arrangement described above applies. As described above, this invention would allow keyless or remote operation of doors and/or trunk and/or any other function or area equipped with a passive anti theft security system in the same way as described above.

Additionally, it is important to note that some passive anti theft security systems employ a single coil such as coil 21. This coil serves the dual function of transmitting the signal to the transponder and receiving a signal from the transponder. Other passive anti theft security systems employ multiple coils, each serving a different or redundant function. This description of the preferred embodiment describes the invention using two separate coils 21 and 22. However, the same disclosure and principle of operation apply to systems with one or more coils. Finally, the device of the present invention will operate with passive anti theft security systems that both send and receive a predetermined number of signals/codes or continuously send and receive signals/codes. A fair reading of the description of the preferred embodiment indicates that the device of the present invention is not sensitive to this parameter.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A vehicle starting system comprising a remote starting system that is co-operable with a passive anti theft security system, wherein the security system comprises a first coil connected to a passive anti theft security system controller for transmitting a first signal to a first transponder having a third coil and a first code therein, said first transponder being responsive to said first signal to transmit said first code to said first coil, and wherein the remote starting system comprises:

(a) a second selectively operable transponder having a second code and a fourth coil with two terminal ends, said fourth coil being wound about said second transponder; and (b) a relay that shorts said terminal ends of said fourth coil to disable said second transponder and prevent transmission of said second code to said controller when said passive anti-theft security system is in operation, and that selectively opens said terminal ends of said fourth coil to enable said second transponder and allow transmission of said second code to said controller when said remote starting system is in operation.

2. The vehicle starting system of claim 1 further comprising a second coil, said second coil receiving said first or second code from said first or said second transponder.

3. The vehicle starting system of claim 1 wherein said second transponder is positioned about an ignition switch of a vehicle.

4. The vehicle starting system of claim 1 wherein said second transponder stores the energy transmitted from said first coil to said second transponder.

5. The vehicle starting system of claim 1 wherein said first and second codes are authorized codes recognizable by said passive anti theft security system controller.

6. The vehicle starting system of claim 1 further comprising a remote starting system controller that emits a control signal for opening and closing said relay to open and short said fourth coil.

7. The vehicle starting system of claim 1 wherein said relay is normally closed.

8. The vehicle starting system of claim 1 wherein said first code of said first transponder and said second code of said second transponder are identical.

9. The vehicle starting system of claim 1 wherein said first code of said first transponder and said second code of said second transponder are unique.

10. The vehicle starting system of claim 6 further comprising a wireless transmitter that sends a remote start command to the remote starting system controller, said remote start command causing said remote starting system controller to open normally closed contacts of said relay thereby enabling the operation of said second transponder.

11. A vehicle starting system comprising a remote starting system that is co-operable with a passive anti theft security system, wherein the vehicle starting system comprises:

(a) a first coil energized by a passive anti theft security system controller to emit a first signal;

(b) a first transponder having a first code and a third coil, said third coil receiving said first signal from said first coil and transmitting said first code to said passive anti theft security system controller via said first coil;

(c) a second transponder having a second code and a fourth coil having at least one loop with two terminal ends, said fourth coil being wound about said second transponder; and (d) a relay that shorts said terminal ends of said fourth coil to disable said second transponder and prevent transmission of said second code to said controller when said passive anti-theft security system is in operation, and that selectively opens said terminal ends of said fourth coil to enable said second transponder and allow transmission of said second code to said controller when said remote starting system is in operation.

12. The vehicle starting system of claim 11 further comprising a second coil, said second coil receiving said first or second code from said first or said second transponder.

13. The vehicle starting system of claim 11 wherein said second transponder is positioned about an ignition switch of a vehicle.

14. The vehicle starting system of claim 11 wherein said second transponder stores the energy transmitted from said first coil to said second transponder.

15. The vehicle starting system of claim 11 wherein said first and second codes are authorized codes recognizable by said passive anti theft security system controller.

16. The vehicle starting system of claim 11 further comprising a remote starting system controller that emits a control signal for opening and closing said relay to open and short said fourth coil.

17. The vehicle starting system of claim 11 wherein said relay is normally closed.

18. The vehicle starting system of claim 11 wherein said first code of said first transponder and said second code of said second transponder are identical.

19. The vehicle starting system of claim 11 wherein said first code of said first transponder and said second code of said second transponder are unique.

20. The vehicle starting system of claim 16 further comprising a wireless transmitter that sends a remote start command to the remote starting system controller, said remote start command causing said remote starting system controller to open normally closed contacts of said relay thereby enabling the operation of said second transponder.

21. A method to employ a remote vehicle starting system that is co-operable with a passive anti theft security system, the security system comprising a first coil connected to a passive anti theft security system controller for transmitting a first signal to a first transponder having a third coil and a first code therein, said first transponder being responsive to said first signal to transmit said first code to said first coil, the method comprising:

(a) positioning a second transponder, having a second code and a fourth coil with two terminal ends wound about said second transponder, about the first coil of the passive anti theft security system; and (b) selectively shorting or opening said terminal ends of said fourth coil to selectively enable and disable said second transponder via a relay having normally closed contacts, said relay shorting said fourth coil and disabling the operation of said second transponder and said relay opening said closed contacts and enabling the operation of said second transponder upon receipt of a remote start signal.

22. The vehicle starting system of claim 1 wherein the passive anti theft security system controller receives the first code if the second transponder is disabled and receives the second code if the second transponder is enabled, and wherein the controller provides necessary signals to continue operation of the vehicle if the received code came from an authorized transponder and does not provide necessary signals to continue operation of the vehicle if the received code did not come from an authorized transponder.

23. The vehicle starting system of claim 11 wherein the passive anti theft security system controller receives the first code if the second transponder is disabled and receives the second code if the second transponder is enabled, and wherein the controller provides necessary signals to continue operation of the vehicle if the received code came from an authorized transponder and does not provide necessary signals to continue operation of the vehicle if the received code did not come from an authorized transponder.

* * * * *